Figure 1:
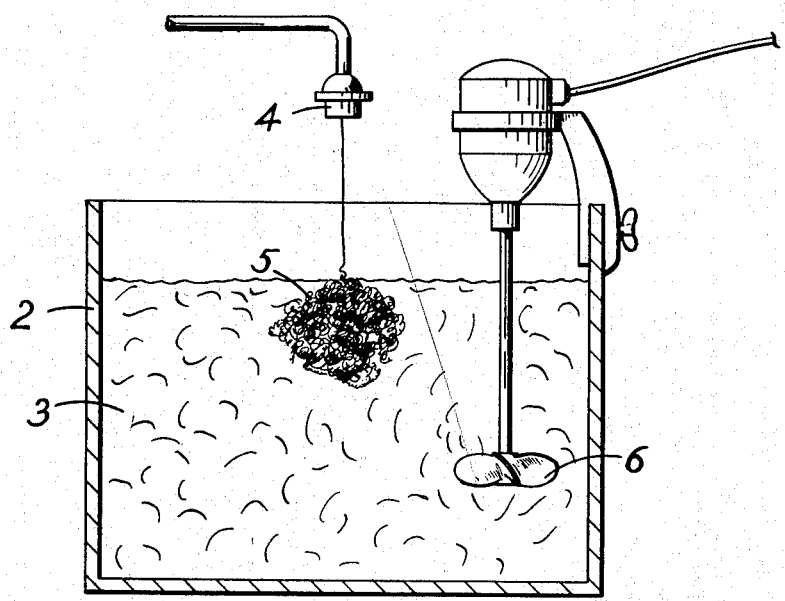

April 6, 1948.  O. A. BATTISTA  2,439,034
PROCESS OF FORMING POROUS ARTIFICIAL MASSES
Filed March 16, 1944

INVENTOR.
Orlando A. Battista
BY Carl A. Castellan
ATTORNEY

Patented Apr. 6, 1948

2,439,034

UNITED STATES PATENT OFFICE 2,439,034

PROCESS OF FORMING POROUS ARTIFICIAL MASSES

Orlando A. Battista, Claymont, Del., assignor to American Viscose Corporation, Wilmington, Del., a corporation of Delaware Application March 16, 1944, Serial No. 526,799

8 Claims. (Cl. 18—54)

This invention relates to the production of porous artificial masses and more especially to the production of porous artificial masses comprising regenerated cellulose.

I have produced artificial masses which are of novel structure and which comprise a continuous monofilament of regenerated cellulose bunched up on itself and having permanent waves or crimps impressed thereon which crimps interlock or mesh with one another to form interstitial pores or cavities. By varying the conditions under which the masses are produced, it is possible to obtain inter-cellular bodies having various size interstitial spaces therein and being of varying degrees of porosity, and of varying textures ranging from soft, springy or resilient bunched up masses having extremely fine interstitial pores, to harder and less resilient bunched up masses which have larger interstitial pores and which may be of a hardness even approaching that of glass. The masses are extremely light in weight, have good mechanical strength, have to a marked degree the ability to absorb and retain liquids, and are useful for numerous widely diversified purposes.

The new artificial masses may be obtained in several ways. One method which I have found practical and convenient is to extrude viscose through a spinneret or jet having a single orifice into a heated liquid to effect heat-coagulation thereof and under conditions such that a permanent crimp is impressed on the monofil as it piles up on itself in the form of a bunched or balled up mass, the heat coagulation and crimping being effected substantially simultaneously and in a single operation, so that the crimps interlock or mesh throughout the bunched up mass during coagulation thereof, the result being that the interlocked crimps are permanently set in the mass to form interstitial spaces or pore-like cavities which are thus provided in the mass without the assistance of special extraneous pore-forming substances of any kind. Accordingly, the viscose may be extruded into an aqueous solution of ammonium sulfate maintained at a temperature of about 100° C. and preferably at a lower temperature, say in the neighborhood of about 80° C., and which serves as a medium for heat coagulating the viscose. In order to effect simultaneous coagulation and crimping of the extruded viscose, the ammonium sulfate solution is agitated continuously. The porosity and rigidity of the final product are controlled by the size of the monofil and the rate at which the ammonium sulfate solution or other medium capable of effecting heat coagulation of viscose is agitated during coagulation thereof. As an illustrative example, when the monofil has a relatively small cross-section, as for instance monofils of about 100 to 300 deniers or thereabouts, moderate agitation of the ammonium sulfate solution is sufficient to produce a monofil having interlocking crimps permanently impressed thereon to form a bunched-up mass having myriad fine pores or interstitial spaces homogeneously distributed throughout its entirety, and which is soft, resilient, capable of being squeezed in the hand, and of recovering to substantially its original size after release of the squeezing pressure. When however, the monofil is of relatively large cross-section, as for instance, monofils of 800 to 2,000 deniers or more, very vigorous agitation of the ammonium sulfate solution is required and masses of increased rigidity and hardness and having larger or coarser interstitial pores result.

Agitation of the solution capable of effecting heat coagulation of viscose may be obtained in any suitable manner, as by means of a stirring device positioned therein, or by continually circulating a current of air therethrough. Preferably, the specific gravity of the ammonium sulfate solution or the like is adjusted to slightly less than the specific gravity of the viscose, and it may vary somewhat depending upon the degree of ripeness of the viscose, etc., but is usually in the range of 1.080 to 1.115 at 60° C., so that as the viscose is continuously extruded, and coagulation and crimping are initiated, the extruded material is buoyed up or supported at or near the surface of the heated agitated solution, in the form of a mass, which insures access of the heat to all portions of the piled up material and thus insures uniform coagulation thereof. Because the viscose is coagulated by heat alone, and acid regenerating baths are not utilized, the formation of an outer layer of acid-coagulated viscose encasing an inner gel which does not become coagulated until later, is avoided, and the heat readily penetrates the bunched up material to effect rapid coagulation of all parts thereof.

Further, special after-treatment of the masses, such as desulfurizing or the like, is not required, and the final masses, when they have reached the desired size, may be withdrawn and leached with water to remove impurities occuring as the result of the heat coagulation and decomposition, after which they are ready for use.

Any viscose of any salt point as determined by the standard common salt (NaCl) test or the Hottenroth test (NH₄Cl) may be used although it may be preferred to use a viscose which has been ripened by the usual methods nearly to the coagulation point.

Heat coagulation of viscose may take place rather slowly under ordinary conditions, and particularly in the case of mono-filaments of relatively large cross-section, and in order to insure that coagulation and crimping will proceed apace, when the viscose is extruded into the agitated ammonium sulfate solution or other suitable heated liquid, I find it advantageous to incorporate a viscose gelation accelerator with the viscose, prior to extrusion thereof, although in the case of monofilaments of comparatively small cross-section, say monofils of 100 to 300 deniers or so, this expedient is not usually essential, the use of the gelation accelerator being optional in such cases. Viscose gelation accelerators may be defined as substances which are capable of effecting gelation of viscose more rapidly than heat alone at any given temperature. There are many substances which are thus capable of accelerating the rate of heat coagulation of viscose, among which may be mentioned compounds of di- and tetra-valent tin, aceto-acetic ester, aluminum compounds, antimony compounds, arsenic compounds, and zinc sulfate. The viscose gelation accelerator may be added to the viscose in a wide range of proportions, the proportion in each case depending upon the particular accelerator employed, and varying from less than 0.1% up to 10% or more. Tin compounds, of which sodium stannate and stannic chloride are examples, are particularly effective viscose gelation accelerators, and may be used in amounts as small as 1% to effect substantially complete coagulation of the extruded viscose under the conditions of temperature etc. described herein, in two and one half minutes or less.

The bunched-up masses thus obtained are water-insoluble, resistant to common solvents and fluids, and may be used with advantage for many practical purposes. Thus, bunched up or balled up masses may be obtained which are useful as substitutes for natural sponges, as cleaning and polishing means, substitutes for steel wool for household use, packing materials etc. Masses may also be obtained which are useful as sound and heat insulating materials, for which use they are preferably impregnated or treated with substances which serve as fire retarding agents, and with stiffening materials such as ground glass, Fuller's earth, etc. The masses may be cut into discs, wads, matts, or the like and used as filters for filtering liquids or gases, or, in the case of the finer pored softer masses, they may be used as filling material for cushions or other pieces of upholstery or the like, as for example fillings for mattresses.

The properties of these artificial masses comprising a continuous monofil of regenerated cellulose, crimped, and bunched or balled up on itself, may also be modified by incorporating therewith other effect materials such as fillers, pigments, dyes, delustering agents, etc., or such substances may be incorporated with the viscose prior to extrusion thereof.

The masses may also be treated with formaldehyde, or natural or synthetic resins, such as phenol-aldehyde and phenol ketone resins, for example, phenol formaldehyde resins, diphenylol propane-formaldehyde or ketone resins, phenol-furfural resins, aromatic sulphonamide-aldehyde resins, benzo-phenone aldehyde resins, and the polymerized vinyl resins. Advantageously the resins may be added to the mass after the latter is leached with water and prior to drying thereof, so that the resins are cured when the mass is later dried by heat.

Because of their very low specific gravity these masses may be utilized in the construction of articles adapted to float on water, such as life saving belts, rafts, etc., especially when the surface of the mass is sealed by having a wrapping of a water-proofing composition applied thereto.

By continuously extruding the viscose or viscose admixed with a gelation accelerator into a uniformly and constantly agitated solution capable of effecting heat-coagulation thereof, maintained at about 80° C., porous bunched up or balled up masses are obtained in which the interstitial pores are of uniform size, whether fine or coarse, and substantially evenly distributed in the form of a continuous network. It is also possible, by intermittently varying the amount of viscose extruded and/or the rate of agitation of the heat-coagulating medium, to obtain light weight porous bunched up masses which combine in a single structure, both fine-pored and coarse-pored sections. Such bunched up masses having non-uniform interstitial pores are very useful for certain purposes; for example, they may be used for filtering liquids containing both large and small particles of solid matter, the large particles being detained by the coarser interstitial pores, and the smaller particles being detained by the finer interstitial pores, without in any way hampering the flow of the liquid.

Figure 2:
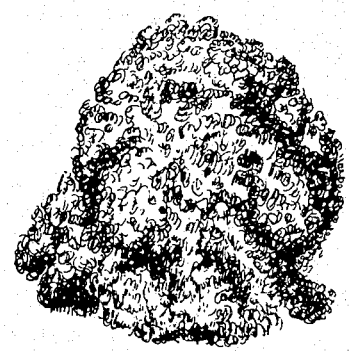

In the accompanying drawing;

Figure 1 is a diagrammatic view of apparatus useful in producing the novel porous bunched up masses; and Figure 2 shows a bunched up mass obtained in accordance with the invention and provided with interstitial pores.

In Figure 1, 2 is a tank containing aqueous ammonium sulfate solution 3, into which viscose is extruded through the single orifice in jet 4, to form a bunched up matt or ball 5 comprising a monofil of regenerated cellulose. 6 is a stirrer for agitating the ammonium sulfate solution at any desired rate.

Of course, in producing the masses on a large scale, the viscose may be pumped through a pipe extending across the length of a long tank or container having ammonium sulfate solution or other suitable heated liquid therein, the pipe being provided at spaced points along its length with jets having a single orifice, so that a multiplicity of masses may be produced simultaneously. The jet or jets may be positioned in the heated liquid, or positioned thereabove so that the extruded viscose drops into the heated liquid by gravity.

The following examples illustrate the invention without being limitative in any way.

*Example I*

Viscose which had been aged to a common salt (NaCl) figure of 5.0 was extruded through a jet having a single orifice (1 mm. in size) into a constantly agitated aqueous solution containing 22% of ammonium sulfate of specific gravity 1.095 at 80° C. and maintained at a temperature of about 80° C. The viscose monofil, which was of about 300 denier, was permitted to pile up on itself in the form of a ball or matt. It was substantially completely heat-coagulated, simultaneously with crimping. The product was withdrawn, leached with water and dried. It was a soft, springy, bunched up mass having myriad small interstitial spaces or fine pores throughout, and being highly absorbent.

*Example II*

Viscose which had been aged to a common salt (NaCl) figure of 5.0 and to which had been added 0.2% by weight of sodium stannate, was continuously extruded through a jet having a single orifice (3 mm. in size) into an aqueous solution containing 22% of ammonium sulfate of specific gravity 1.095 at 80° C., maintained at about 80° C., and being constantly agitated by a current of air passing continuously therethrough. The monofil, which was of about 2,000 deniers, was permitted to pile up on itself and was substantially completely coagulated and simultaneously crimped in ten minutes. The product was withdrawn, leached with water, and dried. It was a hard, non-resilient bunched up mass having a multiplicity of relatively large interstitial spaces or coarse pores distributed throughout its entirety.

It is to be understood that the foregoing detailed description is merely given by way of illustration and that many variations may be made therein without departing from the spirit of the invention or the scope of the appended claims.

I claim:

1. A method of forming artificial porous masses comprising a bunched up monofil of regenerated cellulose having intermeshing crimps forming interstitial pores permanently impressed thereon, which comprises the step of continuously extruding viscose through a jet having a single orifice into an agitated aqueous ammonium sulfate solution maintained at a temperature of about 80° C. to 100° C. and of specific gravity such that the extruded material is buoyed up or supported thereby to substantially simultaneously heat-coagulate and crimp the continuous monofil.

2. A method of forming artificial porous masses comprising a bunched up monofil of regenerated cellulose having intermeshing crimps forming interstitial pores permanently impressed thereon, which comprises the step of continuously extruding viscose containing a viscose gelation accelerator through a jet having a single orifice into an agitated aqueous solution of ammonium sulfate maintained at a temperature of about 80° C. to 100° C. and of specific gravity such that the extruded material is buoyed up or supported thereby to substantially simultaneously heat-coagulate and crimp the continuous monofil.

3. A method of forming artificial masses comprising a bunched up monofil of regenerated cellulose having intermeshing crimps forming interstitial pores permanently impressed thereon, comprising the step of continuously extruding viscose containing sodium stannate through a jet having a single orifice into an agitated aqueous solution of ammonium sulfate maintained at about 80° C. to 100° C. and of specific gravity such that the extruded material is buoyed up or supported thereby to substantially simultaneously heat-coagulate and crimp the continuous monofil.

4. A method of forming artificial masses comprising a bunched up monofil of regenerated cellulose having intermeshing crimps forming interstitial pores permanently impressed thereon, comprising the step of continuously extruding viscose containing stannic chloride through a jet having a single orifice into an agitated aqueous solution of ammonium sulfate maintained at about 80° C. to 100° C. and of specific gravity such that the extruded material is buoyed up or supported thereby to substantially simultaneously heat-coagulate and crimp the continuous monofil.

5. A method of forming artificial masses comprising a bunched up monofil of regenerated cellulose having intermeshing crimps forming interstitial pores permanently impressed thereon, comprising the step of continuously extruding viscose containing about 0.2% by weight of sodium stannate through a jet having a single orifice from 1 mm. to 5 mm. in size, into an agitated solution of ammonium sulfate maintained at about 80° C. to 100° C., and of specific gravity such that the extruded material is buoyed up or supported thereby to substantially simultaneously heat-coagulate and crimp the continuous monofil.

6. A method of forming an artificial mass comprising a bunched up monofil comprising regenerated cellulose having intermeshing crimps forming interstitial pores permanently impressed thereon which comprises the steps of continuously extruding viscose through a jet having a single orifice into an agitated liquid incapable of regenerating viscose to cellulose in the cold, the liquid being heated to a temperature of about 80° C. to 100° C., whereby the cellulose is regenerated, and the specific gravity of the liquid being greater than the specific gravity of the viscose so that the extruded material is buoyed up or supported at the surface of the liquid, the viscose being coagulated and the cellulose being regenerated by the heated liquid simultaneously with crimping of the continuous monofil.

7. A method of forming an artificial mass comprising a bunched up monofil comprising regenerated cellulose having intermeshing crimps forming interstitial pores permanently impressed thereon which comprises the steps of continuously, extruding viscose having admixed therewith a viscose gelation accelerator through a jet having a single orifice into an agitated liquid incapable of regenerating viscose to cellulose in the cold, the liquid being heated to a temperature of about 80° C. to 100° C., whereby the cellulose is regenerated, and the specific gravity of the liquid being greater than the specific gravity of the viscose so that the extruded material is buoyed up or supported at the surface of the liquid, the viscose being coagulated and the cellulose being regenerated by the heated liquid simultaneously with crimping of the continuous monofil.

8. A method of forming an artificial porous mass comprising a bunched up monofil of regenerated cellulose having intermeshing crimps forming interstitial pores permanently impressed thereon, which comprises the step of continuously extruding viscose through a jet having a single orifice into an agitated salt solution incapable of regenerating viscose to cellulose in the cold, the solution being heated to a temperature of about 80° C. to 100° C., whereby the cellulose is regenerated, and the specific gravity of the solution being greater than the specific gravity of the viscose so that the extruded material is buoyed up or supported at the surface of the solution, the viscose being coagulated and the cellulose being regenerated by the heated solution simultaneously with crimping of the continuous monofil.

ORLANDO A. BATTISTA.

REFERENCES CITED

The following references are of record in the file of this patent:

UNITED STATES PATENTS

| Number | Name | Date |
|---|---|---|
| 697,580 | Werner | Apr. 15, 1902 |
| 888,260 | Planchon | May 19, 1908 |
| 2,125,230 | Hofmann | July 26, 1938 |
| 2,249,745 | Charch et al. | July 22, 1941 |
| 2,297,746 | Charch et al. | Oct. 6, 1942 |

FOREIGN PATENTS

| Number | Country | Date |
|---|---|---|
| 368,078 | Great Britain | Mar. 3, 1932 |
| 767,938 | France | May 7, 1934 |
| 28,712 | Great Britain | Dec. 29, 1904 |